United States Patent
Chesler et al.

[15] 3,684,893
[45] Aug. 15, 1972

[54] PULSED LASER ARRANGEMENT

[72] Inventors: Ronald Benjamin Chesler, Summit; Joseph Edward Geusic, both of Berekely Heights, N.J.

[73] Assignee: Bell Telephone Laboratories Incorporated, Murray Hill, N.J.

[22] Filed: April 12, 1971

[21] Appl. No.: 133,210

[52] U.S. Cl. ............................... 307/88.3, 321/69 R
[51] Int. Cl. ............................................... H02m 5/06
[58] Field of Search ..................... 307/88.3; 321/69 R

[56] References Cited

UNITED STATES PATENTS 3,609,389    9/1971    Bjorkholm ............... 307/88.3

Primary Examiner—John Kominski
Assistant Examiner—Darwin R. Hostetter
Attorney—R. J. Guenther and Kenneth B. Hamlin

[57] ABSTRACT

A pulsed second harmonic output is obtained from a continuously pumped laser at repetition rates in the 1–10 MHz range. This is accomplished by electrically pulsing an intracavity nonlinear element to establish momentarily the phase-matched condition required for second harmonic generation. The generated harmonic is a high-amplitude optical pulse which is coupled out of the cavity via a harmonic-transparent mirror.

6 Claims, 3 Drawing Figures

PATENTED AUG 15 1972 3,684,893

INVENTORS R. B. CHESLER
J. E. GEUSIC
BY Lucian C. Canepa
ATTORNEY

PULSED LASER ARRANGEMENT

This invention relates to signal translation and more particularly to obtaining a pulsed second harmonic output from a continuously pumped laser arrangement.

BACKGROUND OF THE INVENTION

It is known to double the characteristic output frequency provided by a laser by combining therewith a material that exhibits a nonlinear optical effect. One advantageous such nonlinear optical material is barium sodium niobate ($Ba_2NaNb_5O_{15}$) which, when combined, for example, with a neodymium-doped yttrium aluminum garnet (Nd:YAlG) laser is effective to constitute a particularly efficient harmonic generator. In such a generator the characteristic 1.06-micron infrared output of the Nd:YAlG configuration is converted to a visible (green) output at 0.53 microns, as described in "The Nonlinear Optical Properties of $Ba_2NaNb_5c5$" by J. E. Geusic, H. J. Levinstein, J. J. Rubin, S. Singh and L. G. Van Uitert, *Applied Physics Letters*, Nov. 1, 1967, pp. 269–271.

Moreover, it is known that pulsed operation of a frequency-doubled laser can be achieved by including an additional element, specifically an acousto-optic Q-switch, in the optical cavity. An Nd:YAlG laser adapted for Q-switched second harmonic generation is shown in FIG. 25 of "An Experimental and Theoretical Study of High-Repetition Rate Q-Switched Nd:YAlG Lasers," by R. B. Chesler, M. A. Karr and J. E. Geusic, *Proceedings of the IEEE*, Dec. 1970, pp. 1899–1914. The depicted arrangement includes an Nd:YAlG element, a $Ba_2NaNb_5O_{15}$ nonlinear crystal and an acousto-optic Q-switch positioned along the main axis of the arrangement between cavity-defining mirrors.

Another Nd:YAlG laser generator adapted for Q-switched second harmonic operation is shown in FIG. 1 of "Repetitively Q-Switched Nd:YAlG – $LiIO_3$ 0.53–Micron Harmonic Source" by R. B. Chesler, M. A. Karr and J. E. Geusic, *Journal of Applied Physics*, Sept. 1970, pp. 4125–4127. In that arrangement the Nd:YAlG element and the acousto-optic Q-switch are positioned along the main axis of the generator. But the nonlinear crystal, lithium iodate ($LiIO_3$) rather than $Ba_2NaNb_5c5$, is disposed in an off-axis path. (The advantages of using such a folded cavity for second harmonic generation are set forth in a copending application of R. B. Chesler, Ser. No. 818,962, filed Apr. 24, 1969, now U.S. Pat. No. 3,628,045, issued Dec. 14, 1971.).

As a practical matter, acousto-optic Q-switched second harmonic laser generators of the Nd:YAlG type are limited in operation to repetition rates in the range 1–100 kHz. Axial mode-locking has been employed to pulse Nd:YAlG in a stable and efficient manner in the 300 MHz range. But prior to the present invention, no practical and efficient way of pulsing Nd:YAlG lasers at repetition rates in the range between the Q-switched and mode-locked ranges was available.

SUMMARY OF THE INVENTION

An object of the present invention is an improved laser arrangement.

More specifically, an object of this invention is a practical and efficient continuously pumped laser arrangement adapted to provide a pulsed second harmonic output at a repetition rate of approximately 1–10 MHz.

These and other objects of the present invention are realized in a specific illustrative embodiment thereof that comprises a continuously pumped laser element positioned in an optical cavity that includes a mirror element transmissive to second harmonic radiation. Also included in the cavity is a nonlinear element which can be phase-matched for second harmonic generation. Quiescently, the temperature of the nonlinear element is selected such that the phase-matching condition required for second harmonic generation is not satisfied. Under such conditions a fundamental signal is sustained within the cavity but no second harmonic signal is available to be coupled out of the cavity.

Pulsing the nonlinear element with an electrical signal of a specified amplitude alters the phase-matching factor within the element in a predetermined manner by means of the electro-optic effect. In this way power at the fundamental is converted to the harmonic during the persistence of the applied electrical signal. In turn, the harmonic pulse is coupled from the cavity by the harmonic-transmissive mirror element. As a result, a substantial portion of the stored energy of the cavity is dumped, the output of the arrangement being a narrow optical pulse whose peak power is determined by the quiescent intracavity circulating power.

A feature of the present invention is that the phase-matching condition required in a nonlinear optical element for second harmonic generation is selectively controlled to achieve a variable output coupling for the second harmonic signal from a laser cavity that contains the nonlinear element.

Another feature of this invention is that the phase-matching condition required for second harmonic generation be established in the cavity by applying an electrical pulse signal to the nonlinear optical element.

BRIEF DESCRIPTION OF THE DRAWING

A complete understanding of the present invention and of the above and other objects, features and advantages thereof may be gained from a consideration of the following detailed description of several specific illustrative embodiments thereof presented hereinbelow in connection with the accompanying drawing, in which.

DETAILED DESCRIPTION

Figure 1:
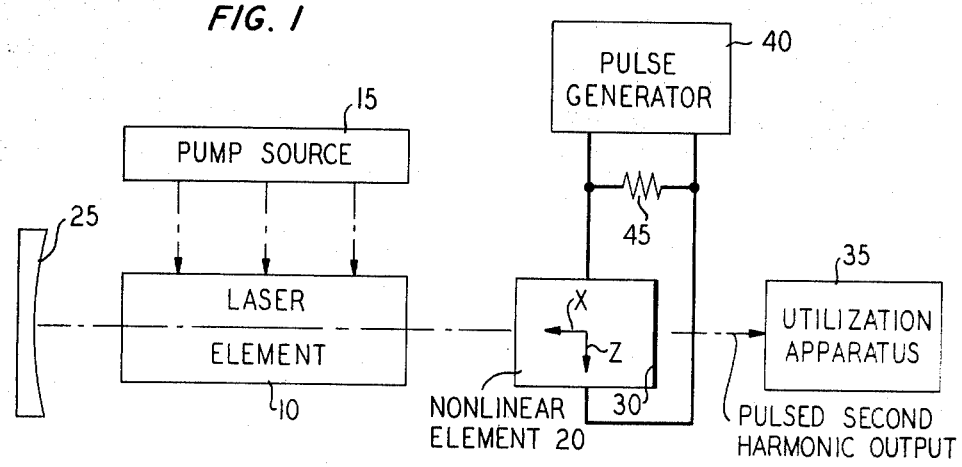
FIGS. 1 and 2 respectively depict pulsed laser arrangements made in accordance with the principles of the present invention.

The specific arrangement shown in FIG. 1 includes a laser element 10 continuously pumped by a source 15. Illustratively, the element 10 comprises an Nd:YAlG rod and the source 15 includes a tungsten lamp. In one practical arrangement the element 10 and the lamp are placed at the respective foci of a gold-plated elliptical cylinder (not shown) which constitutes a pumping cavity.

In Nd:YAlG, oscillation can be achieved corresponding to a number of infrared transitions, the most prominent room-temperature transition occurring at 1.06 microns. Herein, for illustrative purposes, oscillations will be assumed to occur at 1.06 microns.

In addition, it is well known that visible outputs from an Nd:YAlG laser can be obtained by combining therewith a nonlinear material which can be phase-matched for second harmonic generation. The FIG. 1 arrangement includes such a nonlinear material, the element 20. Illustratively, the element 20 is a crystal of $Ba_2NaNb_5c5$. By means of the element 20 it is possible to convert a substantial portion of the available output at the fundamental (1.06 microns) to the harmonic (0.53 microns).

Both of the elements 10 and 20 of FIG. 1 are contained in an optical cavity defined by a concave mirror 25 and a planar mirror 30, the mirror 30 being disposed, for example, on the right-hand end of the element 20. The mirror 25 is selected to be highly reflective to both fundamental and harmonic signals directed thereat, whereas the mirror 30 is selected to be highly reflective to the fundamental but highly transmissive to the harmonic.

Advantageously, in a manner well known in the art, the optical cavity represented in FIG. 1 is designed so that the laser element 10 itself provides sufficient aperturing to allow oscillation in the cavity only in the fundamental ($TEM_{oo}$) transverse mode.

If the phase conditions that are known to be required for second harmonic generation are not quiescently satisfied in the nonlinear element 20, only the fundamental signal at 1.06 microns oscillates within the cavity. The fundamental propagates through the nonlinear element 20 along the axis designated X, Z indicating the optic axis of the element 20. In such a phase-mismatched state, the element 20 is essentially transparent to the fundamental. Since the mirror 30 is highly reflective to the fundamental and since no harmonic exists quiescently in the arrangement, substantially no output is delivered to utilization apparatus 35 when the element 20 is phase-mismatched.

Illustratively, the aforementioned phase-mismatched condition is achieved quiescently by selectively controlling the temperature of the nonlinear element 20 of FIG. 1. (A.A.Ballman et al U.S. Pat. No. 3,262,058, issued July 19, 1966, discloses that phase-matching in a nonlinear medium depends on the medium evidencing a degree of birefringence adequate to compensate for dispersion in the medium and, furthermore, that the birefringence-dispersion relationship in the medium is strongly temperature-dependent.) The high birefringence and dispersion of $Ba_2NaNb_5O_{15}$ permit phase-matched second harmonic generation of 0.53 microns from 1.06 microns at temperatures slightly above room temperature. For light propagating in the X direction with the fundamental polarized parallel to the Y axis (which is perpendicular to the plane of FIG. 1) and the harmonic polarized parallel to Z, phase-matched second harmonic generation utilizing $d_{32}$ occurs in $Ba_2NaNb_5c5$ at a temperature of approximately 80° C.

In accordance with the principles of the present invention, the temperature of the nonlinear element 20 shown in FIG. 1 is purposely adjusted to be a few degrees removed from the temperature at which phase-matching is realized. Thus, for example, if the element 20 is made of $Ba_2NaNb_5O_{15}$, a temperature of approximately 82° C. will achieve quiescently a phase-mismatched condition. As specified below, such a mismatched condition can be compensated for on a controlled intermittent basis in a unique and advantageous manner.

Figure 3:
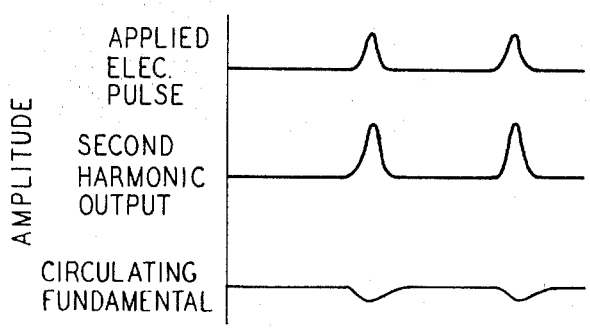
FIG. 3 shows some waveforms that are helpful in understanding the mode of operation of the depicted arrangements.

In the specific illustrative embodiment shown in FIG. 1 the coupling of second harmonic signals out of the depicted cavity is modulated by the phase-matching factor $$\frac{\sin^2\left(\frac{\Delta Kl}{2}\right)}{\left(\frac{\Delta Kl}{2}\right)^2} \quad (1)$$

where $l$ is the length (along the X axis) of the element 20, and $\Delta K = (4\pi f/c)(n_{2f}^e - n_f^o)$, where $f$ is the fundamental frequency, $c$ is the speed of light, and $n_f^o$ and $n_{2f}^e$ are the indices of refraction in the element 20 for the fundamental and harmonic, respectively. The coupling can be varied from zero to its maximum value by adjusting the temperature of the element 20 so that $\Delta Kl = 2\pi$ (phase-mismatched) and then applying an electric field which provides an additional phase shift to make $\Delta Kl = 0$. For light propagated along the X axis (utilizing $d_{32}$ for harmonic conversion) and an applied field along the Z axis, a field-length product ($El$) of about 2,640 volts yields $|\Delta Kl| = 2\pi$. Thus, for example, for a nonlinear element 20 having dimensions 5 × 5 millimeters by 1 millimeter in the Z direction, the required voltage to achieve the phase-matched condition is about (2,640)/(5) or approximately 5530 volts. Accordingly, application of such a voltage pulse (see top row of FIG. 3) causes a substantial portion of the circulating fundamental to be converted to the harmonic. In turn the harmonic is dumped out of the cavity via the harmonic-transmissive mirror 30 (see second row of FIG. 3)

In cavity-dumped operation as described above, the depicted laser arrangement stores energy in the optical cavity during the interpulse period when the output transmission of the mirror 30 is almost zero. During each pulse interval a portion of the circulating fundamental is converted to the harmonic. During those intervals the consequent decrease in the level of the circulating fundamental is represented in the bottom row of FIG. 3. Between intervals the level of the circulating fundamental reestablishes itself at a predetermined quiescent level.

In accordance with the principles of the present invention, an electrical pulse generator 40 is connected to the nonlinear element 20 (FIG. 1) to apply momentarily an electric field of a predetermined value along the Z axis. This field exactly compensates for the quiescent phase-mismatched condition and thus serves in effect to switch the depicted arrangement momentarily to its phase-matched second-harmonic-generating state. Advantageously, a resistor 45 is connected in parallel with the element 20 and the generator 40 to facilitate fast decay of applied pulses. (For a dielectric constant $K_Z = 51$, the capacitance of the element 20 is about 11 picofarads.) For a repetition rate M and a pulse width $(D)/(M)$ (where D is the duty cycle), a time constant RC of approximately $(D)/(5M)$ is adequate for repetition rates in the 1 – 10 MHz range. The average power supplied by the generator 40 is given by $(V^2D)/(R) = 5MV^2C$. If, as a practical matter, an additional 9 picofrarads is allowed for stray capacitance, the average power supplied by the generator 40 is about 28 watts per MHz of repetition rate.

Commercial generators are available to supply electrical pulses at this power level in the 1 – 10 MHz range.

The range of repetition rates for which efficient harmonic cavity dumping is feasible can be expressed in terms of $\epsilon$, the decay time constant of the optical cavity represented in FIG. 1. The value of this constant is given by $$\epsilon = (c\Delta)/(2L) \qquad (2)$$

where $c$ is the speed of light, $2L$ is the round trip optical path length, and $\Delta$ is the round trip fractional loss. For a typical Nd:YAlG laser, $2L$ approximates one meter, $\Delta$ approximates 0.01 and $\epsilon$ therefore is about 3 MHz. Efficient harmonic cavity dumping with a duty cycle $D$ requires a coupling constant approximately $(1)/(D)$ times the continuous wave optimum value for repetition rates equal to or greater than $\epsilon$. For repetition rates much less than $\epsilon$, the required coupling rapidly becomes unrealizable. For example, at $(\epsilon)/(10)$, a coupling constant roughly 3,300 times the continuous wave optimum value is required for efficient 10 percent duty cycle operation. The delay constant $\epsilon$ can be significantly decreased by using a lengthened or folded delay line cavity (see, for example, *Applied Optics*, Vol. 3, No. 4, p. 523, 1964). On the other hand, harmonic cavity dumping at or above $\epsilon$ is feasible with high-optical-quality $Ba_2NaNb_5O_{15}$. Illustratively, for efficient operation at 1 MHz, a cavity optical length on the order of two meters suffices. The peak output power at 1 MHz varies linearly with the nonlinear coupling strength employed. At 1 MHz, for a coupling strength 10 times the continuous wave optimum value, the peak harmonic power output is about 25 times the continuous wave output, with a pulse halfwidth of about 40 nanoseconds.

Figure 2:
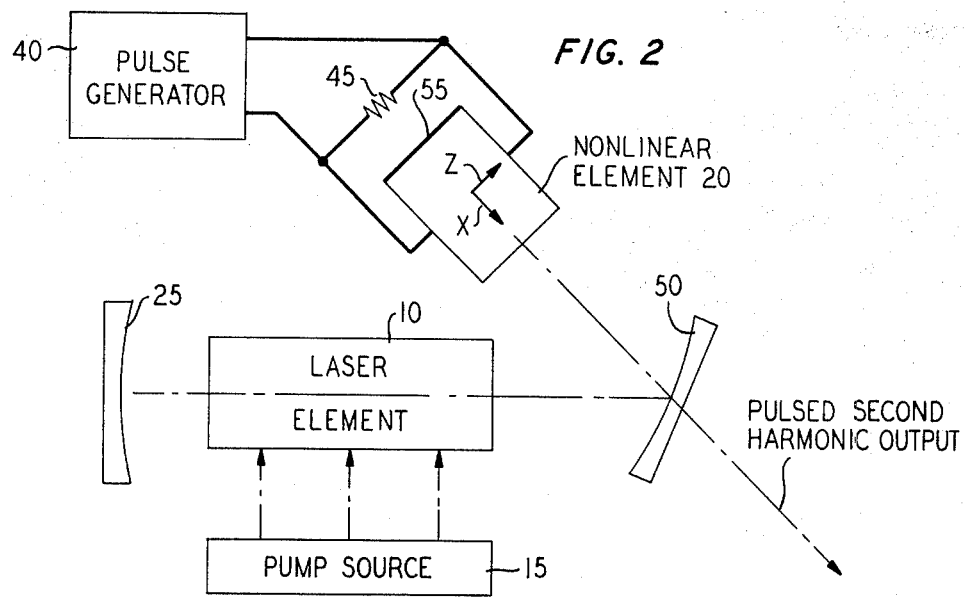

An alternative embodiment of the principles of the present invention is shown in FIG. 2. The FIG. 2 arrangement includes a so-called folded cavity of the type described in the aforecited Chesler application. As is set forth in that application, such a folded cavity allows 100 percent intracavity harmonic conversion and complete collection of the second harmonic in a single output beam. In such a design, the curvature of mirror element 50 and other parameters of the depicted cavity geometry can be chosen to independently adjust the beam radii in the laser element 10 and in the nonlinear element 20.

The elements 10, 15, 20, 25, 40 and 45 shown in FIG. 2 may be identical to the correspondingly numbered units of FIG. 1. The FIG. 2 arrangement also includes a cavity-defining planar mirror 55 which is designed to be highly reflective to both fundamental and harmonic signals. In addition the aforementioned mirror element 50 is selected to be highly reflective to the fundamental but highly transmissive to the harmonic. In all essential respects, the overall mode of operation of the FIG. 2 embodiment in providing a pulsed second harmonic output in response to electrical signals provided by the generator 40 is the same as that described above in connection with the FIG. 1 arrangement.

It is to be understood that the above-described arrangements are only illustrative of the application of the principles of the present invention. In accordance with these principles, numerous other arrangements may be devised by those skilled in the art without departing from the spirit and scope of the invention. For example, although emphasis herein has been directed to a particular pulsed second harmonic system including Nd:YAlG and $Ba_2NaNb_5O_{15}$, it is to be understood that a variety of other laser and nonlinear materials are available and suitable for substitution therefor.

What is claimed is

1. Apparatus for providing pulsed second harmonic output signals comprising
   means defining a laser cavity,
   pumping means,
   means positioned in said cavity and responsive to radiation emitted by said pumping means for causing a fundamental signal to be propagated in said cavity,
   a quiescently phase-mismatched nonlinear element positioned in said cavity in the path of said fundamental signal,
   and means for momentarily establishing a phase-matched condition in said nonlinear element so that the fundamental signal directed at said nonlinear element is converted to a pulsed second harmonic signal which is dumped out of said cavity.

2. Apparatus as in claim 1 wherein said means for causing a fundamental signal to be propagated in said cavity comprises an element made of Nd:YAlG.

3. Apparatus as in claim 2 wherein said nonlinear element is made of $Ba_2NaNb_5O_{15}$.

4. Apparatus as in claim 3 wherein said means defining a laser cavity comprises
   first and second mirror elements spaced apart along a main longitudinal axis of said cavity and containing therebetween both said means for causing a fundamental signal to be propagated and said nonlinear element, said first mirror element being highly reflective to fundamental and second harmonic signals directed thereat, said second mirror element being highly reflective to fundamental signals but highly transmissive to second harmonic signals directed thereat.

5. Apparatus as in claim 3 wherein said means defining a laser cavity comprises
   first and second mirror element spaced apart along a main longitudinal axis of said cavity and containing therebetween said means for causing a fundamental signal to be propagated, said first mirror element being highly reflective to both fundamental and second harmonic signals directed thereat, said second mirror element being highly reflective to fundamental signals but highly transmissive to second harmonic signals directed thereat, said second mirror element being structured to direct incident main-axis fundamental signals along an off-axis path and to direct incident off-axis fundamental signals along said main axis,
   and a third mirror element disposed in said off-axis path and spaced apart from said second mirror element, said nonlinear element being positioned in said off-axis path between said second and third mirror elements, said third mirror element being highly reflective to both fundamental and second harmonic signals.

6. In combination,
   means defining a laser cavity, said means including a mirror element transmissive only to second harmonic signals, laser element means positioned within said cavity and responsive to being pumped for generating a fundamental signal within said cavity, nonlinear element means positioned within said cavity and, when phase-matched, responsive to said fundamental signal for generating second harmonic signals, said nonlinear element means being quiescently phase-mismatched so that said fundamental signal passes therethrough with minimal nonlinear interaction and minimal second harmonic generation whereby minimal energy is coupled out of said cavity, and means connected to said nonlinear element means for applying thereto an electrical signal to establish therein the phase-matched condition required for second harmonic generation whereby during the application of said electrical signal a high-amplitude second harmonic optical pulse is generated and coupled out of said cavity via said mirror element.

* * * * *

UNITED STATES PATENT OFFICE
CERTIFICATE OF CORRECTION

Patent No. 3,684,893                    Dated August 15, 1972

Inventor(s) Ronald B. Chesler and Joseph E. Geusic

It is certified that error appears in the above-identified patent and that said Letters Patent are hereby corrected as shown below:

Col. 1, line 19, delete "$Ba_2NaNb_5c5$" and insert --$Ba_2NaNb_5O_{15}$;

line 44, delete "$Ba_2NaNb_5c5$" and insert --$Ba_2NaNb_5O_{15}$.

Col. 3, line 7, delete "$Ba_2NaNb_5c5$" and insert --$Ba_2NaNb_5O_{15}$;

line 58, delete "$Ba_2NaNb_5c5$" and insert --$Ba_2NaNb_5O_{15}$.

Col. 4, line 29, after "approximately" delete "5530" and insert --530--.

Signed and sealed this 20th day of March 1973.

(SEAL)
Attest:

EDWARD M. FLETCHER, JR.                ROBERT GOTTSCHALK
Attesting Officer                       Commissioner of Patents